(12) United States Patent
Batarseh

(10) Patent No.: US 11,674,373 B2
(45) Date of Patent: Jun. 13, 2023

(54) LASER GRAVITY HEATING

(71) Applicant: Saudi Arabian Oil Company, Dhahran (SA)

(72) Inventor: Sameeh Issa Batarseh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 215 days.

(21) Appl. No.: 17/319,798

(22) Filed: May 13, 2021

(65) Prior Publication Data
US 2022/0364446 A1   Nov. 17, 2022

(51) Int. Cl.
*E21B 43/24* (2006.01)
*B23K 26/12* (2014.01)

(52) U.S. Cl.
CPC ........ *E21B 43/2406* (2013.01); *B23K 26/128* (2013.01)

(58) Field of Classification Search
CPC .......................... E21B 43/2406; B23K 26/128
See application file for complete search history.

(56) References Cited

U.S. PATENT DOCUMENTS

| | | | |
|---|---|---|---|
| 4,228,856 A | 10/1980 | Reale | |
| 6,888,097 B2 | 5/2005 | Batarseh | |
| 7,487,834 B2 | 2/2009 | Reed et al. | |
| 8,748,687 B2 | 6/2014 | Sirdeshpande | |
| 9,353,612 B2 | 5/2016 | Batarseh | |
| 9,453,400 B2 | 9/2016 | Wheeler et al. | |
| 9,644,464 B2 | 5/2017 | Batarseh | |
| 9,796,047 B2 | 10/2017 | Saenger | |

(Continued)

FOREIGN PATENT DOCUMENTS

| | | |
|---|---|---|
| CN | 203081295 U | 7/2013 |
| CN | 109025950 A | 12/2018 |

(Continued)

OTHER PUBLICATIONS

Batarseh, Sameeh et al.; "Flow Enhancement by High Power Laser Technology" IPTC-19308-MS, International Petroleum Technology Conference, Beijing, China, Mar. 26-28, 2019; pp. 1-7.
Batarseh, Sameeh I. et al.; "High Power Laser Technology in Downhole Applications, Reshaping the Industry" SPE-188507-MS, Abu Dhabi International Petroleum Exhibition & Conference, Abu Dhabi, UAE, Nov. 13-16, 2017; pp. 1-15.

(Continued)

*Primary Examiner* — Crystal J. Lee
(74) *Attorney, Agent, or Firm* — Bracewell LLP; Constance G. Rhebergen; Eleanor L. Tyson

(57) ABSTRACT

A method to produce in-situ steam comprising the steps of producing a laser beam in a steam generator segment positioned in a wellbore in a formation; introducing the laser beam to an activated carbon container, where the activated carbon container comprises activated carbon; increasing a temperature of the activated carbon with the laser beam to produce a hot activated carbon; introducing water to the activated carbon container through a water supply line; producing steam in the activated carbon container when the water contacts the hot activated carbon; increasing pressure in the activated carbon container as steam is produced until a pressure set point of an inter-container valve is reached; releasing steam through the inter-container valve to a steam container; increasing a pressure in the steam container until a release set point of one or more release valves is reached; and releasing steam through the release valve to the formation.

14 Claims, 5 Drawing Sheets

(56) References Cited

U.S. PATENT DOCUMENTS

| | | | |
|---|---|---|---|
| 9,939,421 | B2 | 4/2018 | Batarseh et al. |
| 2004/0256103 | A1 | 12/2004 | Batarseh |
| 2007/0202452 | A1 | 8/2007 | Rao |
| 2009/0200032 | A1 | 8/2009 | Foret |
| 2013/0228372 | A1 | 9/2013 | Linyaev et al. |
| 2014/0090839 | A1 | 4/2014 | Al-Nakhli et al. |
| 2014/0190691 | A1 | 7/2014 | Mnegar et al. |
| 2014/0360778 | A1 | 12/2014 | Batarseh |
| 2016/0069857 | A1* | 3/2016 | Batarseh .............. G01N 33/388 73/152.18 |
| 2021/0229219 | A1 | 7/2021 | Alabbad et al. |

FOREIGN PATENT DOCUMENTS

| | | |
|---|---|---|
| NZ | 607028 A | 8/2014 |
| WO | 2011112513 A2 | 9/2011 |
| WO | 2014055574 A1 | 4/2014 |
| WO | 20160004323 A3 | 1/2016 |
| WO | 2017100354 A1 | 6/2017 |
| WO | 20170163265 A1 | 9/2017 |

OTHER PUBLICATIONS

International Search Report and Written Opinion for International Application No. PCT/US2022/028788, dated Jul. 29, 2022; pp. 1-16.

International Search Report and Written Opinion for International Application No. PCT/US2022/028789, dated Jul. 29, 2022; pp. 1-15.

Othman, Haitham et al.; "Effective Wellbore Stimulation Methods Utilizing Advanced Thermal Technologies" OTC-30056-MS, Offshore Technology Conference Asia, Nov. 2-6, 2020; pp. 1-15.

Al-Nakhli, Ayman R. et al.; "In Situ Steam Generation: A New Technology Application for Heavy Oil Production" Summer 2017 Saudi Aramco Journal of Technology; pp. 12-22.

Castrogiovanni, Anthony et al.; "Benefits and Technical Challenges of Downhole Steam Generation for Enhanced Oil Recovery" CSUG/SPE 149500, Canadian Unconventional Resources Conference, Calgary, Alberta, Nov. 15-17, 2011; pp. 1-11.

International Search Report and Written Opinion for International Application No. PCT/US2022/028795, dated Aug. 16, 2022; pp. 1-15.

* cited by examiner

LASER GRAVITY HEATING

TECHNICAL FIELD

Disclosed are apparatus and methods for enhanced oil recovery. More specifically, embodiments related to apparatus and methods that incorporate lasers for steam assisted oil recovery.

BACKGROUND

Enhanced oil recovery is a branch of petroleum engineering that focuses on recovery of reservoir heavy oil through enhanced flow from the formation to the wellbore for production. Heavy oil can be defined as having an API gravity of less than 29 with a viscosity greater than 5000 cP, To produce heavy oil from a formation, the communication between the formation containing the heavy oil and the wellbore needs to be improved such that the heavy oil flows to the surface, therefore, viscosity reduction is a must for the flow.

One method of reducing viscosity of the heavy oil is to increase the temperature in the formation. Increased temperature in different forms can lower viscosity and allow the oil to flow. Increased temperatures can be introduced by steam injection, in-situ combustion or electromagnetic heating, including through the use of microwave. Use of radio frequencies can only reach temperatures of 800° C. and cannot be precisely controlled. Steam injection uses steam as a thermal heating method. One of the common steam injection methods is using steam assisted gravity drainage (SAGD). The conventional steam assisted gravity drainage (SAGD) can be understood with reference to FIG. 1. Steam is generated by steam generator (1) on the surface at a distance from the wellhead, steam travels from the steam generator (1) to the wellhead via steam pipes (2) and is then injected into the wellbore (3). Two wells are drilled horizontally, the injector well (4) which is drilled into the hydrocarbon and the producer well (5). Steam is injected through the injector well into the hydrocarbon bearing formation, the heat from the steam reduces the heavy oil, allowing it to flow and drain down due to gravity to be produced by the producer well and pumped to the surface via pump (6).

There are several issues and limitations with conventional SAGD. Heat loss is one of the main issues due to the steam traveling via the steam pipes for long distances. Heat loss occurs because the pipes are split several time to distribute the steam for different injector wells, which causes heat loss especially in the cold and in the winter season. Heat loss also occurs in the wellbore when the steam travels from the wellhead to the injector. Heat loss causes losses of steam quality which makes it inefficient. Another concern is the safety of conventional SAGD, as the steam travels on the surface via pipelines, the pipelines can be damaged with time, rust or accident which causes hot steam to vent in the air and causes damage to anything which the steam comes in contact.

SUMMARY

Disclosed are apparatus and methods for enhanced oil recovery. More specifically, embodiments related to apparatus and methods that incorporate lasers for steam assisted oil recovery.

In a first aspect, a method to produce in-situ steam is provided. The method includes the steps of producing a laser beam in a steam generator segment positioned in a wellbore in a formation, where the laser beam is produced through an optics unit of the steam generator segment from laser energy delivered through a fiber optic cable, introducing the laser beam to an activated carbon container, where the laser beam passes through a wall of the activated carbon container, where the activated carbon container includes activated carbon, increasing a temperature of the activated carbon with the laser beam to produce a hot activated carbon, where the temperature increase occurs over a period from 30 seconds to 3 minutes, where the temperature of the hot activated carbon is between 800° C. and 1795° C., introducing water to the activated carbon container through a water supply line such that the water contacts the hot activated carbon, producing steam in the activated carbon container when the water contacts the hot activated carbon, increasing pressure in the activated carbon container as steam is produced until a pressure set point of an inter-container valve is reached, where the inter-container valve opens when the pressure set point is reached, releasing steam through the inter-container valve to a steam container when the pressure set point is reached such that steam builds up in the steam container, increasing a pressure in the steam container until a release set point of one or more release valves is reached, and releasing steam through the release valve to the formation such that the steam contacts the formation and increases a temperature of the formation.

In certain aspects, the method further includes the steps of generating laser energy in a surface unit located at a surface from which the wellbore extends, and transmitting the laser energy through the fiber optic cable to the steam generator segment. In certain aspects, the method further includes the steps of generating laser energy in a surface unit located at a surface from which the wellbore extends, where the wellbore includes at least one lateral, transmitting the laser energy through the fiber optic cable to the steam generator segment, where the steam generator segment is positioned in an injector branch of the at least one lateral, such that the steam contacts the formation surrounding the at least one lateral, mobilizing hydrocarbons proximate to the injector branch of the at least one lateral, where the increase in temperature of the formation reduces the viscosity of the hydrocarbons such that the hydrocarbons flow, and producing the hydrocarbons through a producer branch of the least one lateral. In certain aspects, the method further includes the steps of turning off the flow of water through the water supply line such that the production of steam in the activated carbon container ceases, reducing the pressure in the activated carbon container such that the inter-container valve closes, reducing the pressure in the steam container after the inter-container valve closes and the steam container empties of steam, and closing the release valve. In certain aspects, the method further includes the steps of turning off the laser energy such that the production of steam in the activated carbon container ceases, reducing the pressure in the activated carbon container such that the inter-container valve closes, reducing the pressure in the steam container after the inter-container valve closes and the steam container empties of steam, and closing the release valve. In certain aspects, where increasing the temperature of the formation facilitates a wellbore operation selected from the group consisting of producing heavy oil, stimulating a reservoir, performing clean up in a formation, and combinations of the same.

In a second aspect, a system for producing in-situ steam is provided. The system includes a fiber optic cable, the fiber optic cable configured to deliver laser energy from a surface unit, and a steam generator segment. The steam generator segment includes an optics unit electrically connected to the fiber optic cable, the optics unit configured to produce a laser beam from the laser energy, an activated carbon container optically connected to the optics unit, where the laser beam passes through a wall of the activated carbon container, where the activated carbon container includes activated carbon, where the laser beam increases a temperature of the activated carbon to produce a hot activated carbon, a water supply line fluidly connected to the activated carbon container, where the water supply line introduces water to the activated carbon container such that the water contacts the hot activated carbon, where steam is produced in the activated carbon container when the water contacts the hot activated carbon, an inter-container valve fluidly connecting the activated carbon container to a steam container, where the steam increases a pressure in the activated carbon container until a pressure set point of is reached such that the inter-container valve opens when the pressure set point is reached, the steam container fluidly connected to the activated carbon container, where the steam flows from the activated carbon container through the inter-container valve to the steam container, and one or more release valves fluidly connecting the steam container to the area exterior to the steam generator segment, where the steam increases a pressure in the steam container until a release set point of the one or more release valves is reached such that the one or more release valves opens when the release set point is reached.

In certain aspects, the temperature increase of the activated carbon occurs over a period from 30 seconds to 3 minutes, where the temperature of the hot activated carbon is between 800° C. and 1795° C. In certain aspects, the system further includes a surface unit located at a surface from which a wellbore extends into a formation, where the steam generator segment is positioned in the formation. In certain aspects, the system further includes a surface unit located on an offshore platform, where the steam generator segment is positioned on the offshore platform connected to a subsea wellbore. In certain aspects, the system further includes a rotational joint connecting two steam generator segments, where the rotational joint is configured to allow the steam generator segments to rotate around an axis. In certain aspects, the system further includes sensors, the sensors configured to measure temperature of the steam. In certain aspects, the optics unit includes one or more lenses configured to produce the laser beam. In certain aspects, the surface of the activated carbon container proximate to the optics unit includes optical glass.

BRIEF DESCRIPTION OF THE DRAWINGS

These and other features, aspects, and advantages will become better understood with regard to the following descriptions, claims, and accompanying drawings. It is to be noted, however, that the drawings illustrate only several embodiments and are therefore not to be considered limiting of the inventive scope as it can admit to other equally effective embodiments.

Figure 1:
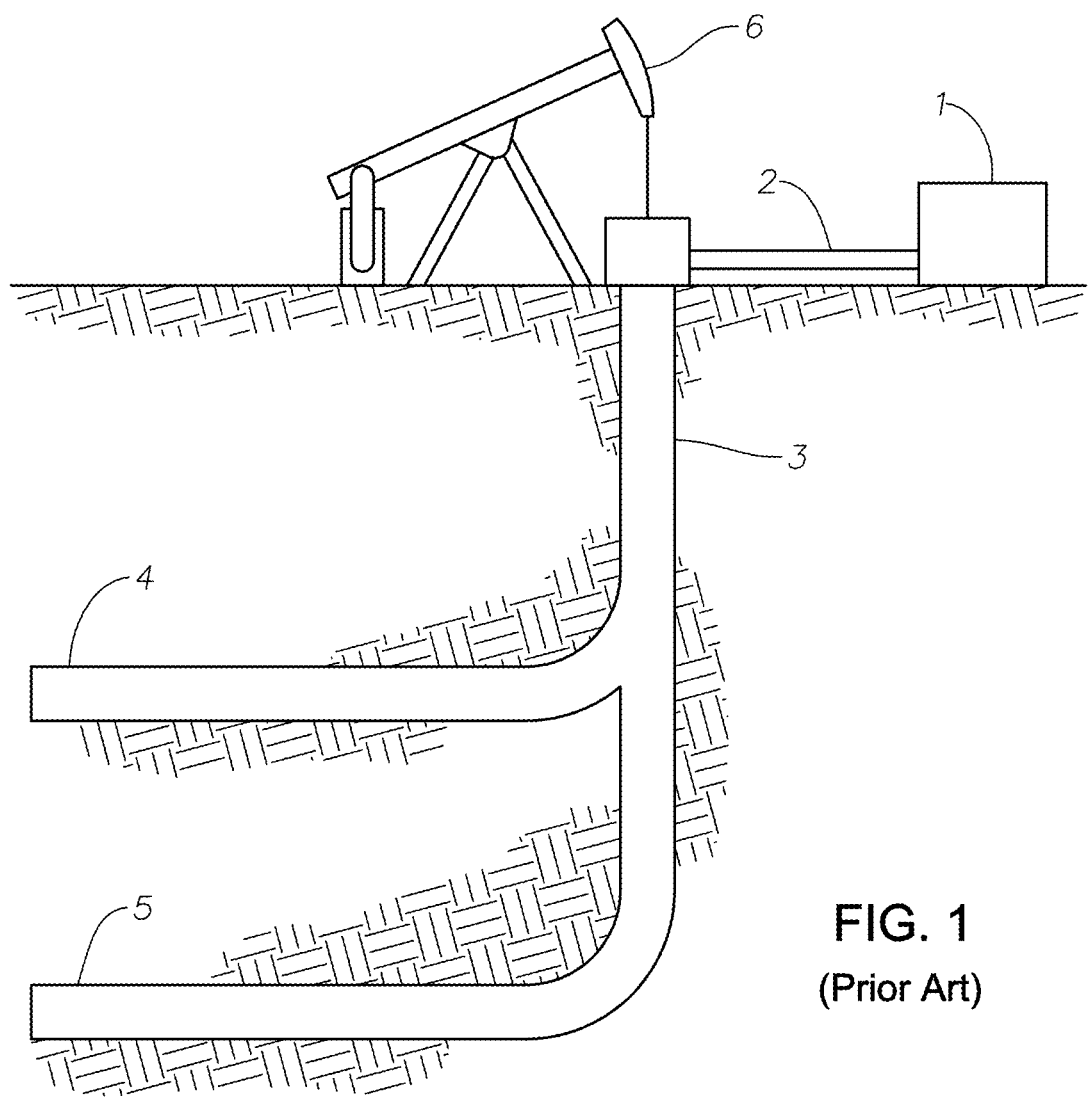
FIG. 1 is diagram of a steam assisted gravity drainage of the prior art.

In the accompanying Figures, similar components or features, or both, may have a similar reference label.

DETAILED DESCRIPTION

While the scope will be described with several embodiments, it is understood that one of ordinary skill in the relevant art will appreciate that many examples, variations and alterations to the apparatus and methods described are within the scope and spirit of the embodiments. Accordingly, the embodiments described here are set forth without any loss of generality, and without imposing limitations. Those of skill in the art understand that the inventive scope includes all possible combinations and uses of particular features described in the specification. In both the drawings and the detailed description, like numbers refer to like elements throughout.

Described are an apparatus and methods for producing steam in-situ using laser energy. The steam generation system combines laser energy combined with activated carbon to generate in-situ steam. The steam generation system can be used to produce heavy oil in configurations utilizing gravity. Advantageously, when the activated carbon is exposed to the laser energy it heats up instantly reaching high temperature in seconds. The activated carbon in the steam generation system can be in the form of gravel. A laser beam passes through the activated carbon and heating it up, then water is injected into the hot activated carbon for steam generation. The steam can be used to increase a temperature of the formation to produce heavy oil or can be used for stimulation.

Advantageously, the steam generation system described combines high power laser energy with activated carbon to generate heat and steam without damaging the formation. Advantageously, the steam generation system produces in-situ steam which reduces the heat loss as steam does not travel from the surface. Advantageously, the steam generation system is a compact tool that can fit through the wellbore and be positioned in the formation. Advantageously, the steam generation system allows for temperature increase of activated carbon in less than 3 minutes to temperatures greater than 1700° C. and when the activated carbon is wet temperatures greater than 1500° C. Advantageously, the steam generation system can produce in-situ steam in less than 3 minutes. Advantageously, the steam generation system provides a method for in-situ steam generation and eliminates heat lost as the steam is generated. Advantageously, the compact size of the steam generation system allows placement of multiple steam generation systems in one wellbore, such that steam can be produced in different zones of the formation simultaneously. Advantageously, the amount and quality of steam produced in each zone can be controlled with the steam generation system.

As used throughout, "activated carbon" refers to carbon that has been treated with the result being a highly porous carbon with increased surface area.

As used throughout, "steam quality" refers to the proportion of saturated steam (vapor) in a mixture of saturated condensate (liquid) and saturated steam (vapor). Steam quality of 0 indicates 100% condensate (liquid), while a steam quality of 100 indicates 100% saturated steam (vapor). Steam with a "high steam quality" is greater than 75, and alternately between 75 and 100.

Figure 2:
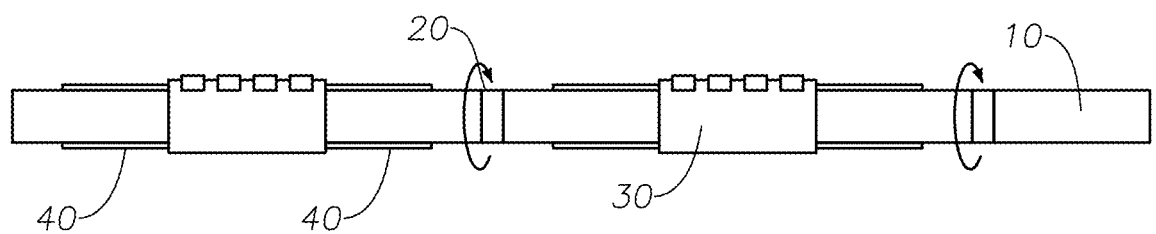
FIG. 2 is a perspective view of an embodiment of the steam generation system.

The steam generation system to produce in-situ steam can be understood with reference to FIG. 2. Fiber optic cable 10 is positioned in the formation. Fiber optic cable 10 carries laser energy 11 from a surface unit positioned at a surface proximate to the formation. The surface unit produces laser energy 11. One or more steam generator segments 30 are arranged in series along fiber optic cable 10. Steam generator segments 30 are connected by rotational joint 20. Rotational joint 20 allows each steam generator segment 30 to rotate such that the steam generated can be targeted to a precise section of the formation. Rotational joint 200 can be any type of rotatable joint used in downhole applications, including rotational joints that are hydraulically powered, battery powered, preprogrammed, or controlled from the surface. Each steam generator segment 30 includes sensors 40 to monitor the operation and temperature proximate to each steam generator segment 30 and the formation. Sensors 40 can be any type of instruments capable of measuring temperature in a steam environment or downhole environment. Sensors 40 measure the steam temperature as a measure of steam quality. Sensors 40 can measure the temperature in the steam generation system as a measure of the alignment and function of the laser beam, where high temperature can indicate the laser energy or laser beam is contacting the steam generation system through laser beam leakage or misalignment. Sensors 40 can be battery powered. Sensors 40 can transmit data to the surface. Sensors 40 can provide feedback to a control loop where the steam generation system can be designed to automatically shut off at certain temperature readings. Sensors 40 can include sensors that can provide data on the target, depth and orientation of the steam generation system.

Figure 3:
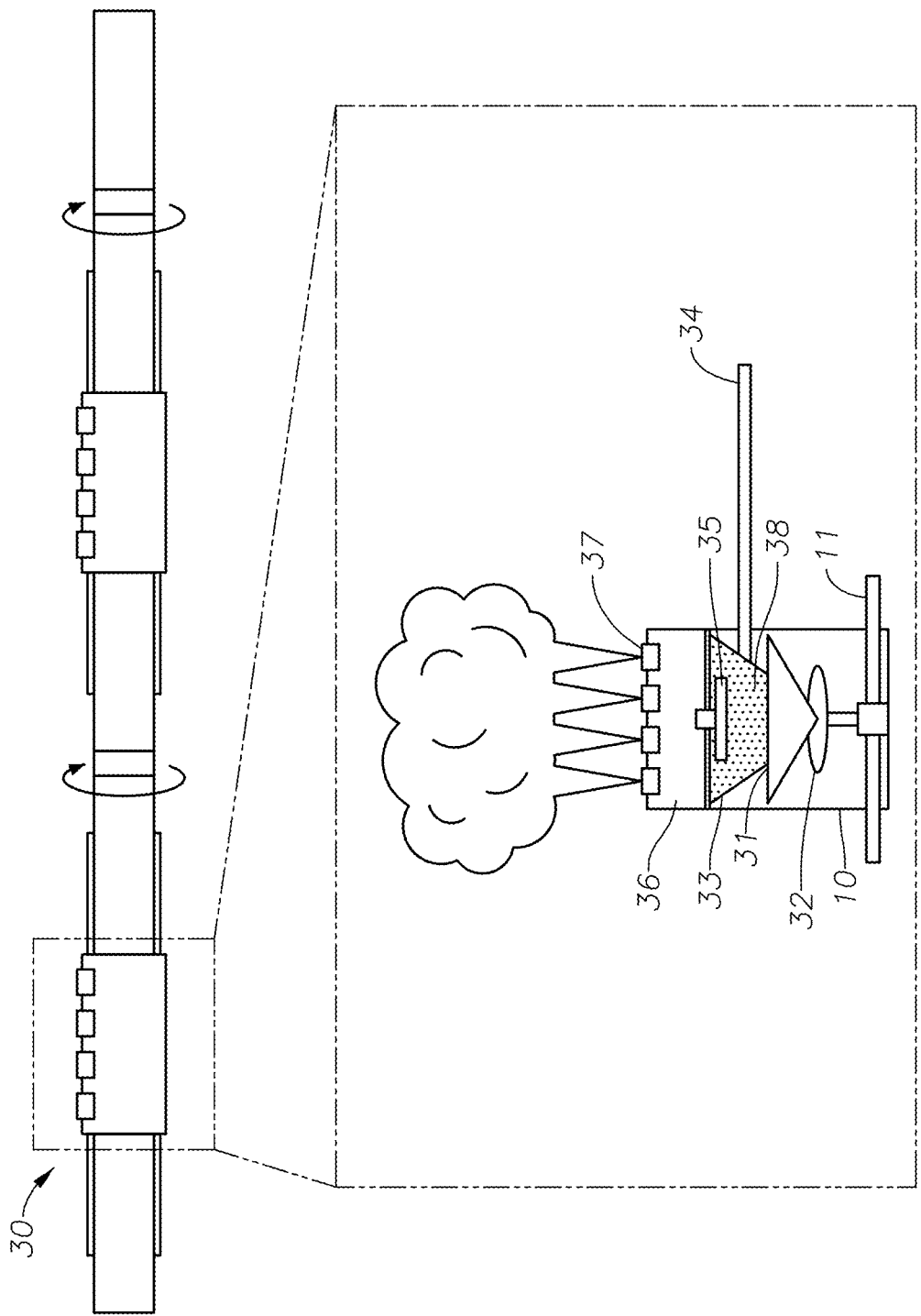
FIG. 3 is a perspective view of an embodiment of the steam generation system.

Steam generator segment 30 can be understood with reference to FIG. 3. Laser energy 11 delivered through fiber optic cable 10 exits fiber optic cable 10 through optics unit 32. Optics unit 32 can include one or more lenses that can shape, manipulate, and shape and manipulate laser energy 11 to produced laser beam 31. Laser beam 31 can be a collimated beam or focused beam due to optics unit 32. A collimated beam, also referred to as a parallel beam, is a straight beam that has uniform power intensity (power divide by area). A focused beam has a focal point and produces a conical shaped beam. In at least one embodiment, laser beam 31 is a focused beam, which produces a larger beam size to maximize interaction between activated carbon 38 and laser beam 31. Laser beam 31 passes through a wall of activated carbon container 33.

Activated carbon container 33 can be any type of compartment capable of holding an amount of activated carbon 38. Activated carbon container 33 can be constructed of any high pressure, high heat resistant material that allows a laser beam to pass into the compartment. Activated carbon container 33 separates the activated carbon such that the activated carbon does not contact the formation or the wellbore. In at least one embodiment, the surface of activated carbon container 33 proximate to optics unit 32 is constructed of optical glass. Optical glass can be any material that allows laser beam 31 to pass through without a change to its physical or chemical characteristics or its physical shape or dimensions. In at least one embodiment the optical glass is constructed from sapphire. Activated carbon container 33 contains activated carbon.

Activated carbon 38 can be any type of carbon the temperature of which can be increased without impacting the physical shape or dimensions of activated carbon 38. Advantageously, activated carbon is used because it can be rapidly heated when exposed to a laser beam, can be molded into any desired shape, and can be designed to have any size desired. In at least one embodiment activated carbon 38 is in the form of gravel. The temperature of activated carbon can be increased in activated carbon container 33 to produce hot activated carbon at a target temperature. The target temperature of hot activated carbon can be between 800° C. and 1795° C., and alternately between 1564° C. and 1795° C. The target temperature is less than the combustion temperature of activated carbon. Advantageously, the use of activated carbon is more efficient than using a laser to heat water directly, which can lose about 33% of energy per inch of water. The target temperature of hot activated carbon can be determined in a lab based on the volume of activated carbon, the power of the laser, and the desired heating time. In at last one embodiment, the target temperature is 1795° C.

Water supply line 34 carries water from the surface to steam generator segment 30. Water supply line 34 can be any type of piping that is high pressure, high heat resistant. Water supply line 34 can supply water to activated carbon container 33. The flow rate of the water through water supply line 34 can be based on the volume of activated carbon and the target temperature.

Inter-container valve 35 is positioned between activated carbon container 33 and steam container 36. Inter-container valve 35 can be any type of one-way valve that allows steam to flow from activated carbon container 33 to steam container 36. In at least one embodiment, inter-container valve 35 is a check valve. In at least one embodiment, inter-container valve 35 is a pressure relief valve. Inter-container valve 35 can be operated according to a pressure set point, such that inter-container valve 35 opens when the pressure set point is reached.

Steam container 36 collects steam produced in activated carbon container 33. Steam container 36 can be any type of container configured to hold pressurized steam.

One or more release valves 37 are positioned between steam container 36 and the surrounding formation. The one or more release valves 37 can be any type of one-way valve that allows steam to flow from steam container 36 to the formation. In at least one embodiment, each release valve 37 can be a check valve. Each release valve 37 can be operated according to a release set point such that each release valve 37 opens when the release set point is reached. Opening release valves 37 on a release set point ensures that the steam released in the formation is released with force. The release set point can be a pressure less than the formation cracking pressure, such that the released steam does not crack the formation. The release set point can be between 800 psi (5,515 kPa) and 1200 psi (8,273 kPa).

The steam released into the formation can be at a temperature greater than 204° C. (400° F.), alternately between 204° C. (400° F.) and 300° C. (572° F.), alternately between 204° C. (400° F.) and 250° C. (482° F.), and alternately between 204° C. (400° F.) and 225° C. (437° F.). In at least one embodiment, the steam is at a temperature greater than 204° C. (400° F.). Advantageously, maintaining the temperature of the steam in this range can eliminate damage to the formation. Advantageously, maintaining steam temperature greater than 204° C. (400° F.) ensures high steam quality. The temperature of the steam can be controlled by the amount of activated carbon, the power of laser energy 11, and the exposure time.

The steam generation system can be used to produce continuous steam or can be used for pulse steam generation.

Figure 4:
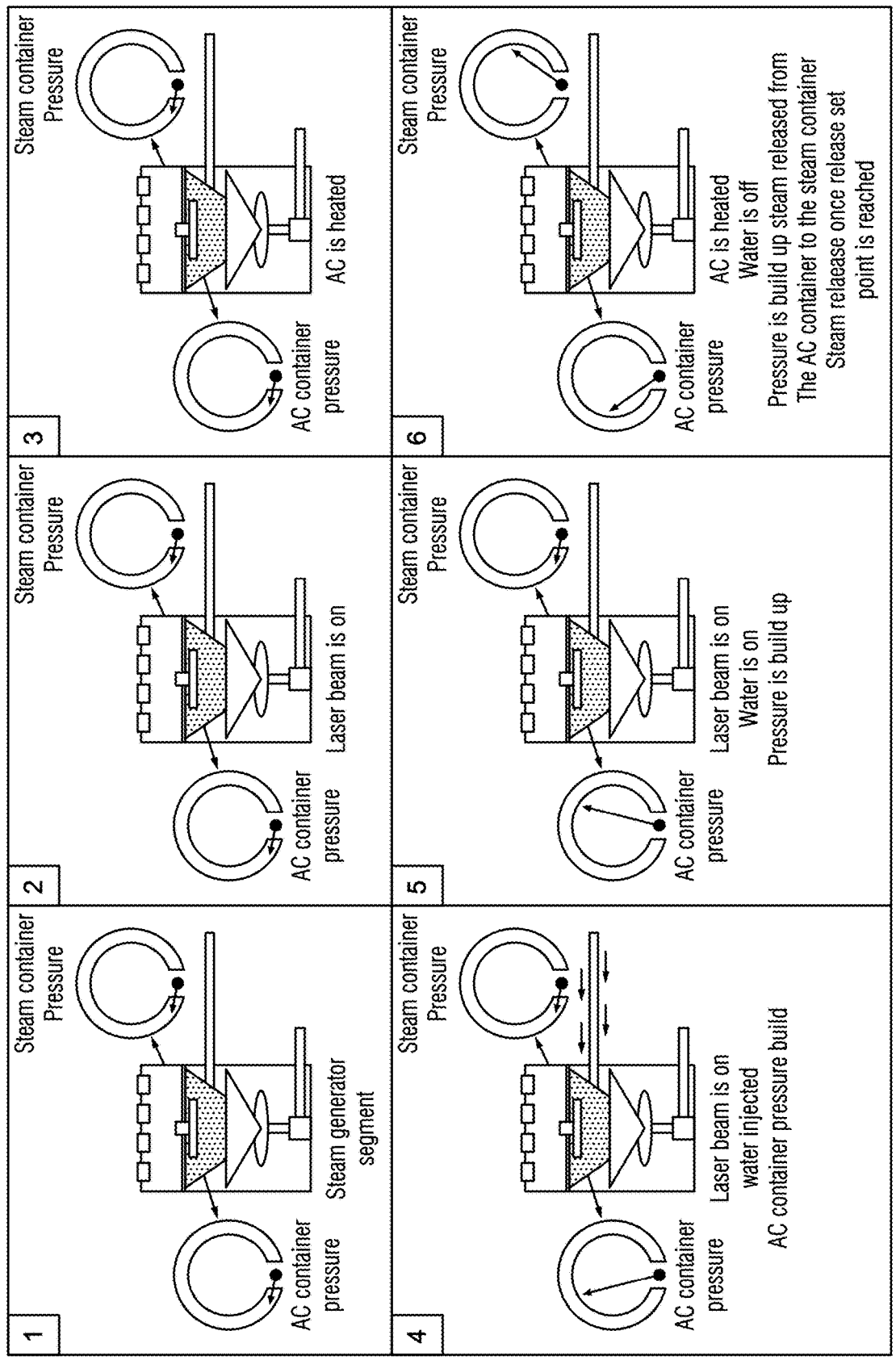
FIG. 4 is a pictorial representation of a method of using the steam generation system.
Figure 5:
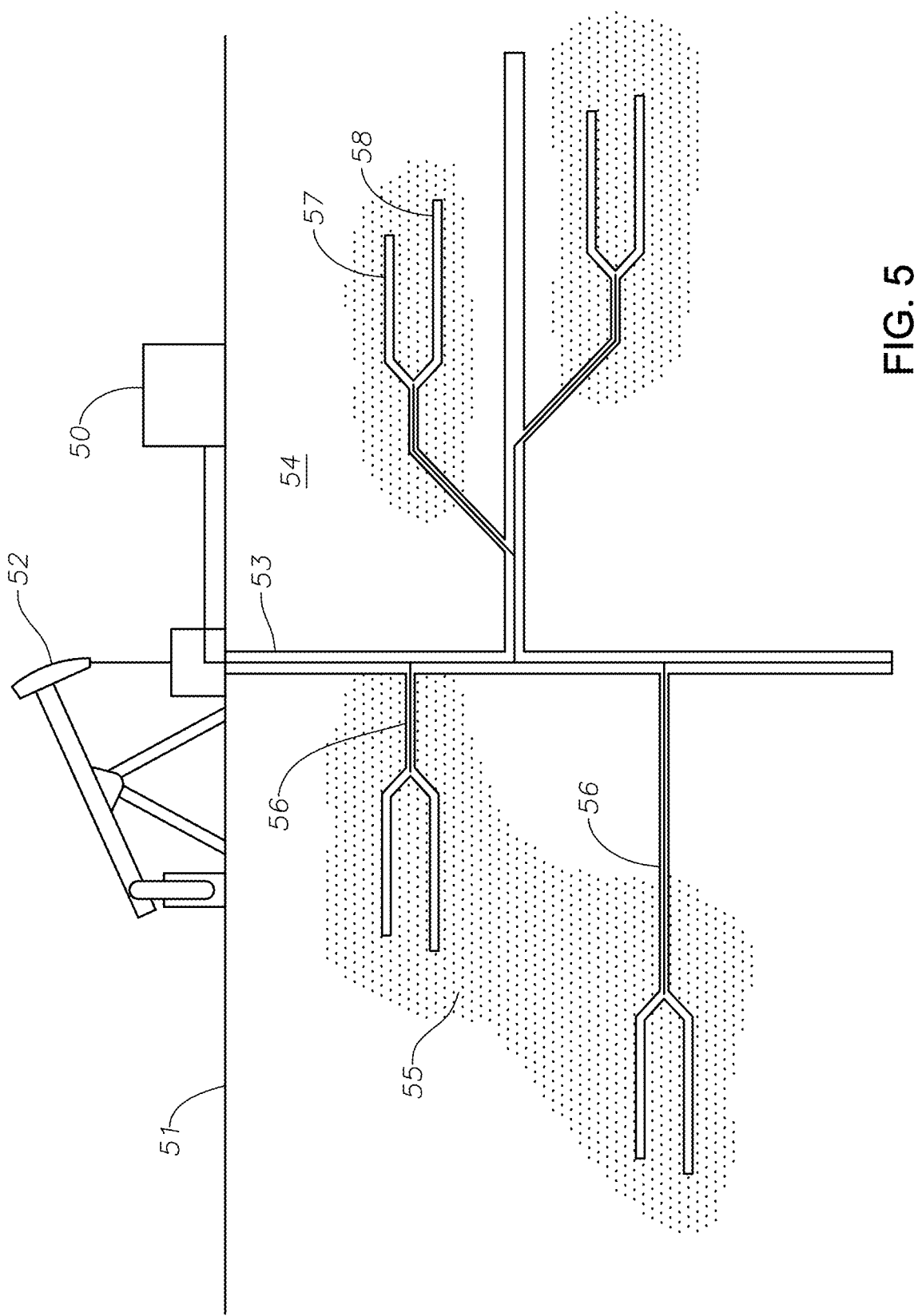
FIG. 5 is an orthogonal view of an embodiment of the steam generation system.

The method of using the steam generation system can be understood with reference to FIGS. 4A-4F and FIGS. 2-3. In FIG. 4A, the steam generation system is shown with laser energy 11 turned off, such that activated carbon container 33 and steam container 36 are at the pressure of the surrounding formation. Inter-container valve 35 and the one or more release valves 37 are closed. Once the steam generation system is in position in the formation, laser energy 11 can be switched on and delivered through fiber optic cable 10 to optics unit 32 to produce laser beam 31 as shown in FIG. 4B. As shown in FIG. 4C, laser beam 31 enters activated carbon container 33 and begins to increase the temperature of activated carbon 38 in activated carbon container 33. At this step, the pressure in both activated carbon container 33 and steam container 36 is the pressure of the surrounding formation. Laser beam 31 can increase the temperature of activated carbon 38 to the target temperature to produce the hot activated carbon. The step of increasing the temperature of activated carbon 38 can take between 30 seconds and 3 minutes depending on the volume of activated carbon in activated carbon container 33. As shown in FIG. 4D, when the hot activated carbon is achieved, water can be injected through water supply line 34. Steam is produced in activated carbon container 33 due to the contact between the hot activated carbon and water. The pressure in activated carbon container 33 increases as steam is produced. The steam produced is superheated steam. During the step of injecting water through water supply line 34 laser beam 31 can be on (as shown) or can be switched to the off position. As the water contacts the hot activated carbon and steam is produced, the temperature of the hot activated carbon can be reduced to a reduced temperature. In at least one embodiment, the reduced temperature is 1564° C. The amount of water injected through water supply line 34 depends on the amount of steam to be injected, the size of activated carbon container 33, the size of steam generator segment 30, and the size of steam container 36. In at least one embodiment, injection of water through water supply line 34 ceases when activated carbon container 33 is full of water and steam. Turning off water from water supply line 34 produces steam and allows pressure to build up.

When the pressure set point of inter-container valve 35 is reached, inter-container valve 35 opens releasing steam from activated carbon container 33 to steam container 36, as shown in FIG. 4E. As steam enters steam container 36, the pressure in steam container 36 begins to build. The pressure in steam container 36 continues to build until the release set point is reached, as shown in FIG. 4F. The one or more release valves 37 open when the release set point is reached such that steam is released through the one or more release valves 37 to the surrounding formation.

In a method of producing continuous steam, then steam is continuously produced during the steps described with reference to FIGS. 4D-4F, and steam continues to flow from activated carbon container 33 through steam container 36 to the surrounding formation. Continuous steam can be achieved by maintaining operation of laser beam 31 to maintain a heat source on activated carbon 38 and by continuously injecting water through water supply line 34.

In a method of pulse steam generation, laser beam 31, water through water supply line 34, or a combination of the same can be turned off. As the flow of steam is minimized, inter-container valve 35 and release valve 37 can close stopping the flow of steam to the surrounding formation. The duration of the on cycle and the off cycle can be based on the flow rate of hydrocarbons from the surrounding formation.

The method of recovering hydrocarbons can be understood with reference to FIG. 5 and FIGS. 4A-4F.

Surface unit 50 is positioned at surface 51 proximate to wellbore 53. Surface unit 50 can be any type of laser generator unit capable of producing laser energy 11 with more than 2 kW power that can be transmitted into wellbore 53 through fiber optic cable 10. In at least one embodiment, surface unit 50 can include a ytterbium fiber laser at a wavelength of 1062 nm. Pump 52 can be positioned proximate to wellbore 53 to capture the oil displaced by the in-situ steam generation. Pump 52 can be any type of pump capable of recovering a flow of hydrocarbons from a formation through a wellbore.

In at least one embodiment, wellbore 53 is a multilateral well containing two or more laterals 56 extending into formation 54. Each lateral 56 terminates in target zone 55 containing hydrocarbons. Laterals 56 can be positioned at different depths in formation 54 and at different distances from wellbore 53. Each target zone 55 can contain one or more laterals 56. Each lateral can contain an injector branch 57 and a producer branch 58. Injector branch 57 and producer branch 58 are situated such that injector branch 57 is at a depth closer to surface 51 than producer branch 58.

Each injector branch 57 of each lateral 56 can include at least one steam generation system. Fiber optic cable 10 connects surface unit 50 to steam generation system. Surface unit 50 can transmit laser energy 11 to one or more steam generation system simultaneously through one more fiber optic cables 10.

As steam is released through release valve 37 it increases the temperature of target zone 55 proximate to each injector branch 57 where at least one steam generation system is positioned. The increase in temperature of target zone 55 mobilizes hydrocarbons contained in target zone 55 causing them to flow due to gravity toward producer branch 58 and then be produced through producer branch 58 to wellbore 53. The increase in temperature of formation 54 in target zone 55 reduces the viscosity of the hydrocarbons in target zone 55 such that the hydrocarbons can flow. The hydrocarbons in target zone 55 can be any hydrocarbons that do not flow at the conditions in formation 54 without a steam assisted gravity drain operation. In at least one embodiment, the hydrocarbons are a viscous heavy oil having a viscosity greater than 200 cP.

Each steam generation system can be operated independently. In at least one embodiment, all steam generation system positioned in each lateral 56 can be operated simultaneously, such that production from every lateral 56 in formation 54 occurs simultaneously. In at least one embodiment, operating each steam generation system independently results in less than 100% of steam generation system in formation 54 producing at one time. Advantageously, operating each steam generation system separately enables control over production, a specific target zone 55 to be targeted, and maximum recovery.

Advantageously, the ability to position multiple steam generation systems in a multilateral well enables production of hydrocarbons from different reservoir configurations.

The steam generation system can be used to produce in-situ steam for wellbore clean up, to improve production, to improve the efficiency of increasing a temperature of the wellbore, for oil recovery, and to generate and inject steam for offshore platforms to produce heavy oil from offshore reservoirs. The same configuration described with reference to FIG. 5 can be used in a method for stimulating a reservoir. The same configuration described with reference to FIG. 5 can be used for wellbore clean up. Advantageously, the steam generation system described can be used to generate and inject steam on offshore platforms where conventional steam generators are bulky and cannot fit on offshore platforms.

The steam generation system is in the absence of steam traveling through the wellbore from the surface as the steam is produced in-situ. The steam generation system is in the absence of microwaves or microwave energy. The steam generation system is in the absence of ceramic materials. The use of the steam generation system is in the absence of ceramic materials deployed in the wellbore and formation. While residual or naturally-occurring water in the formation can be converted to steam, the use of the steam generation system does not rely on the presence of such water to produce steam, rather the water required to produce steam is piped into the steam generation system. The steam generation system is in the absence of injecting water into the formation. In the steam generation system and methods for producing in-situ steam, the activated carbon does not ignite or combust upon application of the laser beam. The steam generation system is in the absence of heating the formation directly with the laser, which is inefficient. The steam generation system operates in the absence of explosive force. The steam released through the steam generation system does not penetrate or spall the formation surrounding the steam generation system.

EXAMPLES

Example 1

Example 1 demonstrates that a laser can be used to increase a temperature of activated carbon to produce hot activated carbon.

Figure 6:
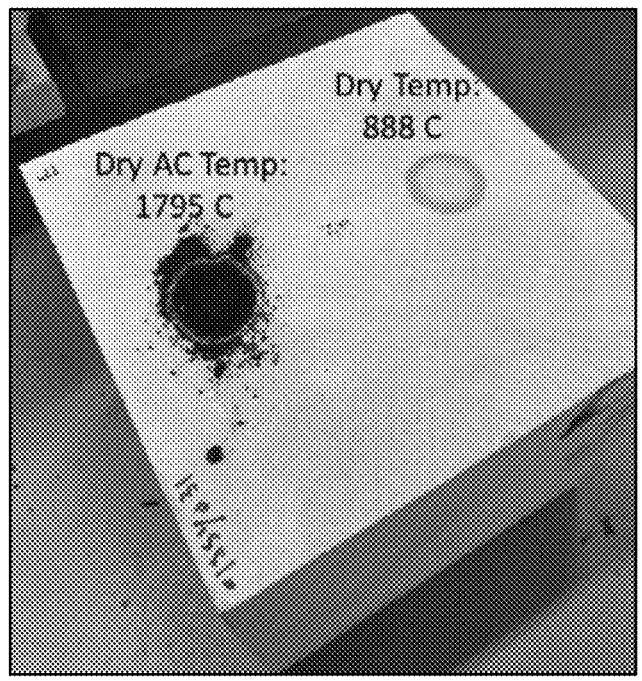
FIG. 6 is a pictorial representation from Example 1.

One area of a block of limestone was covered with activated carbon, as shown in FIG. 6. A second area was left exposed without activated carbon. A laser beam of 1 kW was emitted on both areas, with and without activated carbon. An infra-red (IR) camera was used to capture the temperature of the limestone black in the two areas after being heated for a duration of 30 seconds.

The maximum temperature reached in the area without activated carbon recorded by the IR camera was 888° C. The maximum temperature reach in the area with activated carbon recorded by the IR camera was 1795° C.

In addition to demonstrating the concept, the examples shows that the temperature increase is more effective using activated carbon compared to rocks, such as limestone.

Example 2

Example 2 demonstrates the efficiency of heating wet activated carbon.

Figure 7:
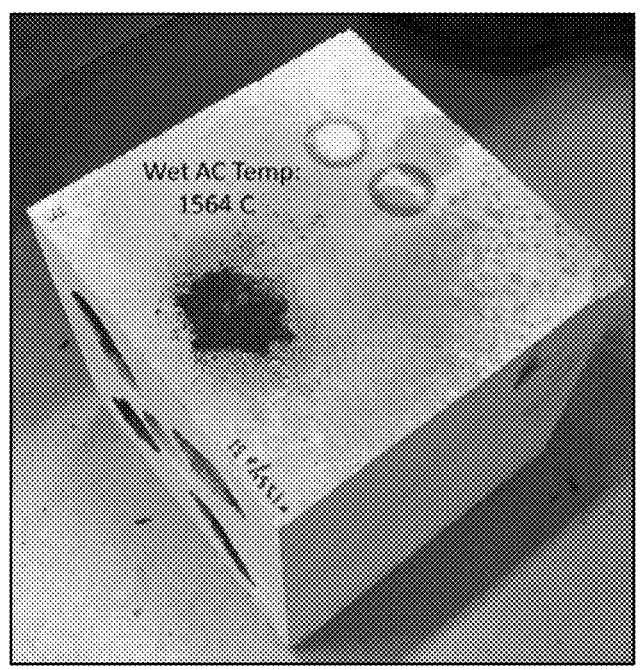
FIG. 7 is a pictorial representation from Example 2.

Water was added to the area of activated carbon from Example 1. The wet area with activated carbon was heated with the 1 kW laser beam for 30 seconds. The maximum temperature reached in the area as recorded by the IR camera was 1564° C. as shown in FIG. 7.

Although the technology has been described in detail, it should be understood that various changes, substitutions, and alterations can be made hereupon without departing from the inventive principle and scope. Accordingly, the scope of the embodiments should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed as from one particular value to another particular value. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art, except when these references contradict the statements made here.

As used here and in the appended claims, the words "comprise," "has," and "include" and all grammatical variations thereof are each intended to have an open, non-limiting meaning that does not exclude additional elements or steps.

What is claimed is:

1. A method to produce in-situ steam, the method comprising the steps of:
producing a laser beam in a steam generator segment positioned in a wellbore in a formation, where the laser beam is produced through an optics unit of the steam generator segment from laser energy delivered through a fiber optic cable;
introducing the laser beam to an activated carbon container, where the laser beam passes through a wall of the activated carbon container, where the activated carbon container comprises activated carbon;
increasing a temperature of the activated carbon with the laser beam to produce a hot activated carbon, where the temperature increase occurs over a period from 30 seconds to 3 minutes, where the temperature of the hot activated carbon is between 800 and 1795° C.;
introducing water to the activated carbon container through a water supply line such that the water contacts the hot activated carbon;
producing steam in the activated carbon container when the water contacts the hot activated carbon;
increasing pressure in the activated carbon container as steam is produced until a pressure set point of an inter-container valve is reached, wherein the inter-container valve opens when the pressure set point is reached;
releasing steam through the inter-container valve to a steam container when the pressure set point is reached such that steam builds up in the steam container;
increasing a pressure in the steam container until a release set point of one or more release valves is reached; and
releasing steam through the release valve to the formation such that the steam contacts the formation and increases a temperature of the formation.

2. The method of claim 1, further comprising the steps of:
generating laser energy in a surface unit located at a surface from which the wellbore extends; and
transmitting the laser energy through the fiber optic cable to the steam generator segment.

3. The method of claim 1, further comprising the steps of:
generating laser energy in a surface unit located at a surface from which the wellbore extends, wherein the wellbore comprises at least one lateral;
transmitting the laser energy through the fiber optic cable to the steam generator segment, wherein the steam generator segment is positioned in an injector branch of the at least one lateral, such that the steam contacts the formation surrounding the at least one lateral;
mobilizing hydrocarbons proximate to the injector branch of the at least one lateral, wherein the increase in temperature of the formation reduces the viscosity of the hydrocarbons such that the hydrocarbons flow; and
producing the hydrocarbons through a producer branch of the least one lateral.

4. The method of claim 1, further comprising the steps of:
turning off the flow of water through the water supply line such that the production of steam in the activated carbon container ceases;
reducing the pressure in the activated carbon container such that the inter-container valve closes;
reducing the pressure in the steam container after the inter-container valve closes and the steam container empties of steam; and
closing the release valve.

5. The method of claim 1, further comprising the steps of:
turning off the laser energy such that the production of steam in the activated carbon container ceases;
reducing the pressure in the activated carbon container such that the inter-container valve closes;
reducing the pressure in the steam container after the inter-container valve closes and the steam container empties of steam; and
closing the release valve.

6. The method of claim 1, wherein increasing the temperature of the formation facilitates a wellbore operation selected from the group consisting of producing heavy oil, stimulating a reservoir, performing clean up in a formation, and combinations of the same.

7. A system for producing in-situ steam, the system comprising:
a fiber optic cable, the fiber optic cable configured to deliver laser energy from a surface unit; and
a steam generator segment, the steam generator segment comprising:
an optics unit electrically connected to the fiber optic cable, the optics unit configured to produce a laser beam from the laser energy;
an activated carbon container optically connected to the optics unit, where the laser beam passes through a wall of the activated carbon container, where the activated carbon container comprises activated carbon, wherein the laser beam increases a temperature of the activated carbon to produce a hot activated carbon;
a water supply line fluidly connected to the activated carbon container, wherein the water supply line introduces water to the activated carbon container such that the water contacts the hot activated carbon, wherein steam is produced in the activated carbon container when the water contacts the hot activated carbon;
an inter-container valve fluidly connecting the activated carbon container to a steam container, wherein the steam increases a pressure in the activated carbon container until a pressure set point of is reached such that the inter-container valve opens when the pressure set point is reached;
the steam container fluidly connected to the activated carbon container, wherein the steam flows from the activated carbon container through the inter-container valve to the steam container; and
one or more release valves fluidly connecting the steam container to the area exterior to the steam generator segment, wherein the steam increases a pressure in the steam container until a release set point of the one or more release valves is reached such that the one or more release valves opens when the release set point is reached.

8. The system of claim 7, wherein the temperature increase of the activated carbon occurs over a period from 30 seconds to 3 minutes, where the temperature of the hot activated carbon is between 800° C. and 1795° C.

9. The system of claim 7, further comprising a surface unit located at a surface from which a wellbore extends into a formation, wherein the steam generator segment is positioned in the formation.

10. The system of claim 7, further comprising a surface unit located on an offshore platform, wherein the steam generator segment is positioned on the offshore platform connected to a subsea wellbore.

11. The system of claim 7, further comprising a rotational joint connecting two steam generator segments, wherein the rotational joint is configured to allow the steam generator segments to rotate around an axis.

12. The system of claim 7, further comprising sensors, the sensors configured to measure temperature.

13. The system of claim 7, wherein the optics unit comprises one or more lenses configured to produce the laser beam.

14. The system of claim 7, wherein the surface of the activated carbon container proximate to the optics unit comprises optical glass.

* * * * *